United States Patent
Lin

(10) Patent No.: US 8,743,210 B2
(45) Date of Patent: Jun. 3, 2014

(54) BLEMISH DETECTION SYTEM AND METHOD USING RECURSION

(71) Applicant: Hon Hai Precision Industry Co., Ltd., New Taipei (TW)

(72) Inventor: Kuo-Hung Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,638

(22) Filed: Dec. 26, 2012

(65) Prior Publication Data

US 2014/0071298 A1    Mar. 13, 2014

(30) Foreign Application Priority Data

Sep. 7, 2012    (TW) .............................. 101132637 A

(51) Int. Cl.
*H04N 17/02*    (2006.01)
(52) U.S. Cl.
USPC .......................................... 348/175; 348/187
(58) Field of Classification Search
CPC ....... H04N 17/002; H04N 5/20; H04N 5/357;
H04N 5/367; H04N 5/203; H04N 5/3675;
H04N 5/2176; H04N 5/217; H04N 5/213
USPC ................. 348/175, 187, 188, 189, 246–251;
382/275
See application file for complete search history.

(56) References Cited

U.S. PATENT DOCUMENTS

| | | | |
|---|---|---|---|
| 7,876,369 B2* | 1/2011 | Aoki ............................. | 348/246 |
| 2004/0051798 A1* | 3/2004 | Kakarala et al. ............... | 348/246 |
| 2005/0078204 A1* | 4/2005 | Matsuoka et al. ............. | 348/247 |
| 2006/0290794 A1* | 12/2006 | Bergman et al. .............. | 348/246 |
| 2007/0035643 A1* | 2/2007 | Hashimoto et al. ........... | 348/246 |
| 2008/0056606 A1* | 3/2008 | Kilgore ......................... | 382/275 |
| 2008/0117318 A1* | 5/2008 | Aoki ............................. | 348/246 |

* cited by examiner

*Primary Examiner* — Victor Kostak
(74) *Attorney, Agent, or Firm* — Novak Druce Connolly Bove + Quigg LLP

(57) ABSTRACT

A blemish detecting system includes an image capturing module, a brightness calculating module, a blemish detection module, a storage module, and a processor. The image capturing module captures an image. The image has a number of pixels. The brightness calculating module calculates the brightness values of the pixels. The blemish detection module gives serial numbers to the pixels according to the locations of the pixels, scans the pixels according to a first sequence, and marks the pixel of which the brightness value is less than a predetermined brightness value as a blemish. The storage module stores the serial numbers of the scanned pixels, and thus the blemish detection module does not need to scan the pixels for a second time. The brightness calculating module and the blemish detection module are computerized instructions and are executed by the processor.

8 Claims, 3 Drawing Sheets

| P10 | P11 | P12 | P13 | P14 | P15 | P16 | P17 | P18 | P19 |
|---|---|---|---|---|---|---|---|---|---|
| P20 | P21 | P22 | P23 | P24 | P25 | P26 | P27 | P28 | P29 |
| P30 | P31 | P32 | P33 | P34 | P35 | P36 | P37 | P38 | P39 |
| P40 | P41 | P42 | P43 | P44 | P45 | P46 | P47 | P48 | P49 |
| P50 | P51 | P52 | P53 | P54 | P55 | P56 | P57 | P58 | P59 |
| P60 | P61 | P62 | P63 | P64 | P65 | P66 | P67 | P68 | P69 |
| P70 | P71 | P72 | P73 | P74 | P75 | P76 | P77 | P78 | P79 |
| P80 | P81 | P82 | P83 | P84 | P85 | P86 | P87 | P88 | P89 |

FIG. 2

BLEMISH DETECTION SYTEM AND METHOD USING RECURSION

BACKGROUND

1. Technical Field

The present disclosure relates to image processing technologies, and particularly relates to a blemish detection system and method.

2. Description of Related Art

A blemish detection process is usually carried out after camera assemblies are assembled to detect whether a blemish is introduced to the camera assemblies or not during the assembly process thereof to ensure the image quality of the camera assemblies. Currently, the blemish detection process is often carried out by a visual inspection under varying criteria, especially given the human element involved (e.g., variances in skill level and in standards of individual inspectors), and is an inefficient use of man-power and resources.

Therefore, it is desirable to provide a blemish detection system and method that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 2 is a schematic view of the blemish detection system of FIG. 1 to assign a serial number to each of a number of pixels of an image.

DETAILED DESCRIPTION

Figure 1:
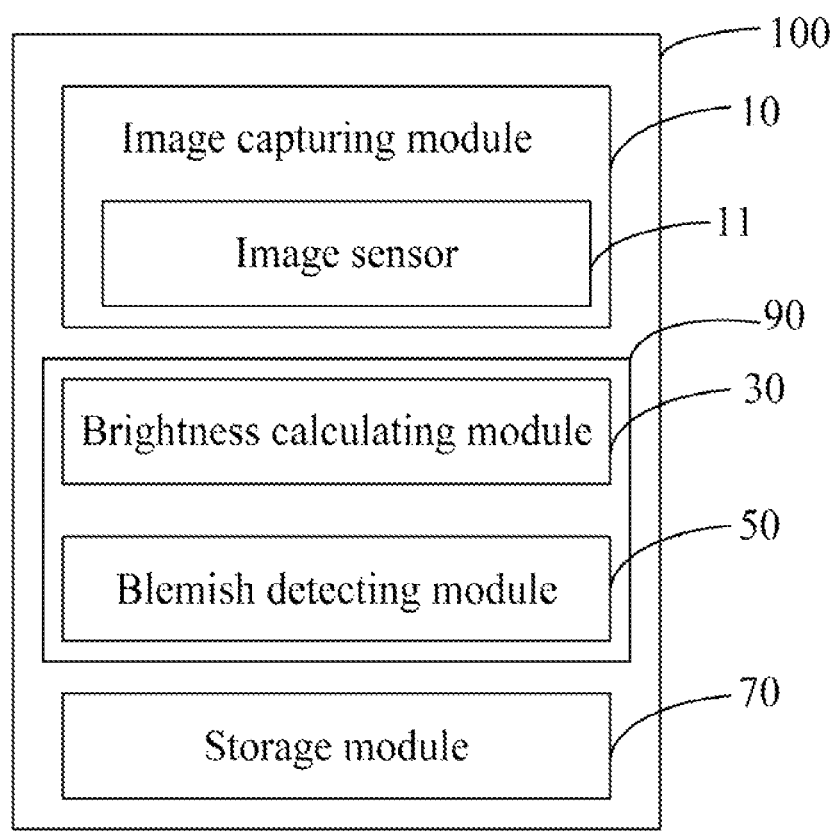
FIG. 1 is a functional block diagram of a blemish detection system, according to an exemplary embodiment.

Referring to FIG. 1, the blemish detecting system 100 includes an image capturing module 10, a brightness calculating module 30, a blemish detecting module 50, a storage module 70, and a process 90.

The image capturing module 10 includes an image sensor 11 for capturing an image. The image has a number of pixels in arrays. In the embodiment, the image capturing module 10 is a hardware (such as a camera).

The brightness calculating module 30 is used for calculating a brightness value of each of the pixels.

The blemish detecting module 50 is used for assigning serial numbers to the pixels according to the locations of the pixels. Referring to FIG. 2, from the left to the right, the serial numbers of the pixels in the first line are P10, P11, P12, P13, P14, P15, P16, P17, P18, P19, the serial numbers of the pixels in the second line are P20, P21, P22, P23, P24, P25, P26, P27, P28, P29, etc.

The blemish detecting module 50 is further used for scanning the pixels that have not been scanned according to a first sequence, the storage module 70 is used for storing the serial numbers of the scanned pixels, and thus the blemish detecting module 50 does not scan the scanned pixels for a second time. In the embodiment, the first sequence is from upwards line to downwards line, and from leftwards pixel to rightwards pixel within each line.

The blemish detecting module 50 stores a predetermined brightness value, and is further used for comparing the brightness value of the scanned pixels with the predetermined brightness value, and marking the scanned pixel of which the brightness value is less than the predetermined brightness value as a blemish.

The blemish detecting module 50 is further used for scanning the pixels which are adjacent to the blemish and have not been scanned according to a second sequence, and the storage module 70 is further used for storing the serial numbers of the scanned pixels adjacent to the blemish. The blemish detecting module 50 is further used for comparing the brightness value of the scanned pixels adjacent to the blemish with the predetermined brightness value, and marking the scanned pixel which is adjacent to the blemish and the brightness value of which is less than the predetermined brightness value as a new blemish, and making a recursion as above until the recursion is ended. In the embodiment, the second sequence is from upwards line to downwards line, and from leftwards pixel to rightwards pixel within each line.

The brightness calculating module 30 and the blemish detecting module 50 are computerized instructions and executed by the processor 90. The storage module 70 is a hardware (such as a flash memory).

Figure 3:
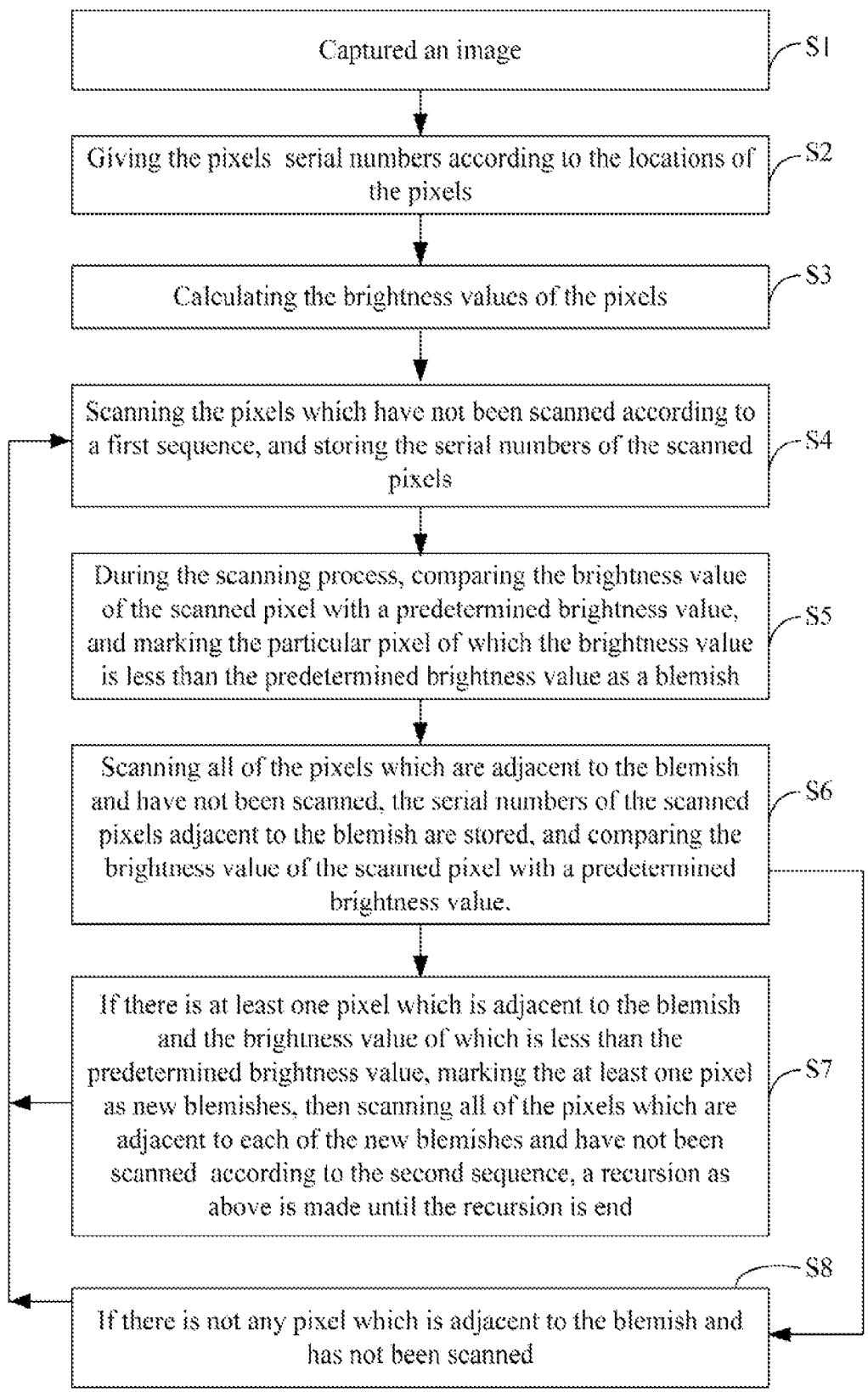
FIG. 3 is a flowchart of a blemish detection method, according to another exemplary embodiment.

Referring to FIG. 3, a blemish detection method using the blemish detection system 100 and includes the following steps.

In step S1, an image is captured and the image includes a number of pixels in arrays. The step S1 is carried out by the image capturing module 10.

In step S2, the pixels are assigned serial numbers according to the locations of the pixels. The step S2 is carried out by the blemish detecting module 50.

In step S3, the brightness values of the pixels are calculated. The step S2 is carried out by the brightness calculating module 30.

In step S4, the pixels which have not been scanned are scanned according to a first sequence, the serial numbers of the scanned pixels are stored, and thus the scanned pixels cannot be scanned for a second time. In the embodiment, the first sequence is from upwards line to downwards line, and from leftwards pixel to rightwards pixel in each line. In the step S4, the calculating module 30 scans the pixels, and the storage module 70 stores the serial numbers of the scanned pixels.

In step S5, during the scanning process, the brightness value of the scanned pixel is compared with a predetermined brightness value, and a particular pixel of which the brightness value is less than the predetermined brightness value is marked as a blemish. The step S5 is carried out by the blemish detecting module 50.

In step S6, all of the pixels which are adjacent to the blemish and have not been scanned are scanned according to a second sequence, the serial numbers of the scanned pixels adjacent to the blemish are stored, and the brightness value of the scanned pixel is compared with a predetermined brightness value. In the embodiment, the second sequence is from upwards line to downwards line, and from leftwards pixel to rightwards pixel within each line. In the step S4, the blemish detecting module 50 scans all of the pixels which are adjacent to the blemish and have not been scanned, and compares the brightness value of the scanned pixel with the predetermined brightness value, the storage module 70 stores the serial numbers of the scanned pixels adjacent to the blemish.

In step S7, if there is at least one pixel which is adjacent to the blemish and the brightness value of which is less than the predetermined brightness value, the at least one pixel are marked as new blemishes, then all of the pixels which are adjacent to each of the new blemishes and have not been scanned are scanned according to the second sequence, a recursion as above is made until the recursion is ended, then returning to S4. The step S7 is carried out by the blemish detecting module 50.

In step S8, if no pixel is adjacent to the blemish that has not been scanned, then returning to S4. The step S8 is carried out by the blemish detecting module 50.

When using the blemish detecting system 100 and the blemish detecting method, the pixels of which the brightness values are less than the predetermined value are marked as blemishes, and the serial number of the pixels which have been scanned are stored in the storage module, and thus all of the pixels are scanned only one time, and the blemish detecting speed is improved.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A blemish detecting system, comprising:
   an image capturing module comprising an image sensor configured for capturing an image, the image having a plurality of pixels;
   a brightness calculating module configured for calculating the brightness values of the pixels;
   a blemish detection module configured for assigning a serial number to each of the pixels according to the locations of the pixels, scanning the pixels according to a first sequence, marking the pixel of which the brightness value is less than a predetermined brightness value as a blemish, only scanning the pixels adjacent to the blemish according to a second sequence, marking a particular pixel which is adjacent to the blemish and the brightness value of which is less than the predetermined brightness value as a new blemish, and then making a recursion to determine whether pixels adjacent to the new blemish are blemishes;
   a storage module configured for storing the serial numbers of the scanned pixels, wherein if the serial numbers of the pixels are stored in the storage module, the blemish detection module does not scan the scanned pixels for a second time; and
   a processor, wherein the brightness calculating module and the blemish detection module are computerized instructions and executed by the processor.

2. The blemish detecting system of claim 1, wherein the first sequence is from upwards line to downwards line, and from leftwards pixel to rightwards pixel within each line.

3. The blemish detecting system of claim 1, wherein the second sequence is from upwards line to downwards line, and from leftwards pixel to rightwards pixel within each line.

4. The blemish detecting system of claim 1, wherein the image capturing module and the storage module are hardware.

5. The blemish detecting system of claim 4, wherein the image capturing module is a camera, and the storage module is a flash memory.

6. A blemish detecting method executed by the blemish detecting system of claim 1, comprising:
   capturing an image using the image capturing module, and the image comprising a plurality of pixels;
   assigning a serial number to each of the pixels according to the locations of the pixels using the blemish detecting module;
   calculating the brightness values of the pixels using the brightness calculating module;
   scanning the pixels that have not been scanned according to a first sequence using the blemish detecting module, and storing the serial numbers of the scanned pixels in the storage module;
   comparing the brightness values of the scanned pixels with a predetermined brightness value using the blemish detecting module, and marking the particular pixel of which the brightness value is less than the predetermined brightness value as a blemish using the blemish detecting module;
   only scanning all of the pixels that are adjacent to the blemish and have not been scanned according to a second sequence using the blemish detecting module;
   storing the serial numbers of the scanned pixels adjacent to the blemish in the storage module;
   comparing the brightness value of the scanned pixels with the predetermined brightness value using the blemish detecting module;
   if there is at least one pixel which is adjacent to the blemish and the brightness value of which is less than the predetermined brightness value, marking the at least one pixel as new blemish using the blemish detecting module;
   only scanning all of the pixels which are adjacent to each of the new blemish and have not been scanned according to the second sequence using the blemish detecting module; and
   making a recursion to determine whether pixels adjacent to the new blemish are blemishes.

7. The blemish detecting method of claim 6, wherein the first sequence is from upwards line to downwards line, and from leftwards pixel to rightwards pixel within each line.

8. The blemish detecting method of claim 6, wherein the second sequence is from upwards line to downwards line, and from leftwards pixel to rightwards pixel within each line.

* * * * *